United States Patent [19]
Finney

[11] Patent Number: 6,139,417
[45] Date of Patent: Oct. 31, 2000

[54] FISH CLEANING DEVICE

[76] Inventor: William O. Finney, 15123 E. Danforth, Luther, Okla. 73054

[21] Appl. No.: 09/312,559

[22] Filed: May 14, 1999

[51] Int. Cl.[7] ................................................. A22C 25/06
[52] U.S. Cl. ............................................ 452/196; 452/195
[58] Field of Search .................................. 452/196, 195, 452/185, 187, 192

[56] References Cited

U.S. PATENT DOCUMENTS

| | | |
|---|---|---|
| 2,932,849 | 4/1960 | Missman . |
| 4,127,919 | 12/1978 | Buddecke . |
| 4,196,538 | 4/1980 | Crone . |
| 4,761,856 | 8/1988 | Ewing . |
| 4,793,027 | 12/1988 | Blight . |
| 4,882,811 | 11/1989 | Ewing . |
| 4,930,188 | 6/1990 | Hyde . |
| 4,977,643 | 12/1990 | Prysock . |
| 5,083,972 | 1/1992 | King . |
| 5,376,043 | 12/1994 | Carter . |
| 5,453,042 | 9/1995 | Novello . |
| 5,522,765 | 6/1996 | Dotson et al. . |
| 5,735,735 | 4/1998 | Hahn et al. . |

*Primary Examiner*—Willis Little
*Attorney, Agent, or Firm*—Mary M. Lee

[57] ABSTRACT

A fish cleaning device that first kills the fish instantly and humanely and then stabilizes the fish for cleaning. The piercing member used to kill the fish is vertically and horizontally movable. In addition, the piercing member is pivotally and rotatably mounted. In this way the fish can be rotated for skinning and held firmly for gutting by the same piercing member. The device is equipped with a mounting assembly by which it can be firmly and removably mounted to the trunk of a tree, to the ground, or to a worktable or other surface.

42 Claims, 6 Drawing Sheets

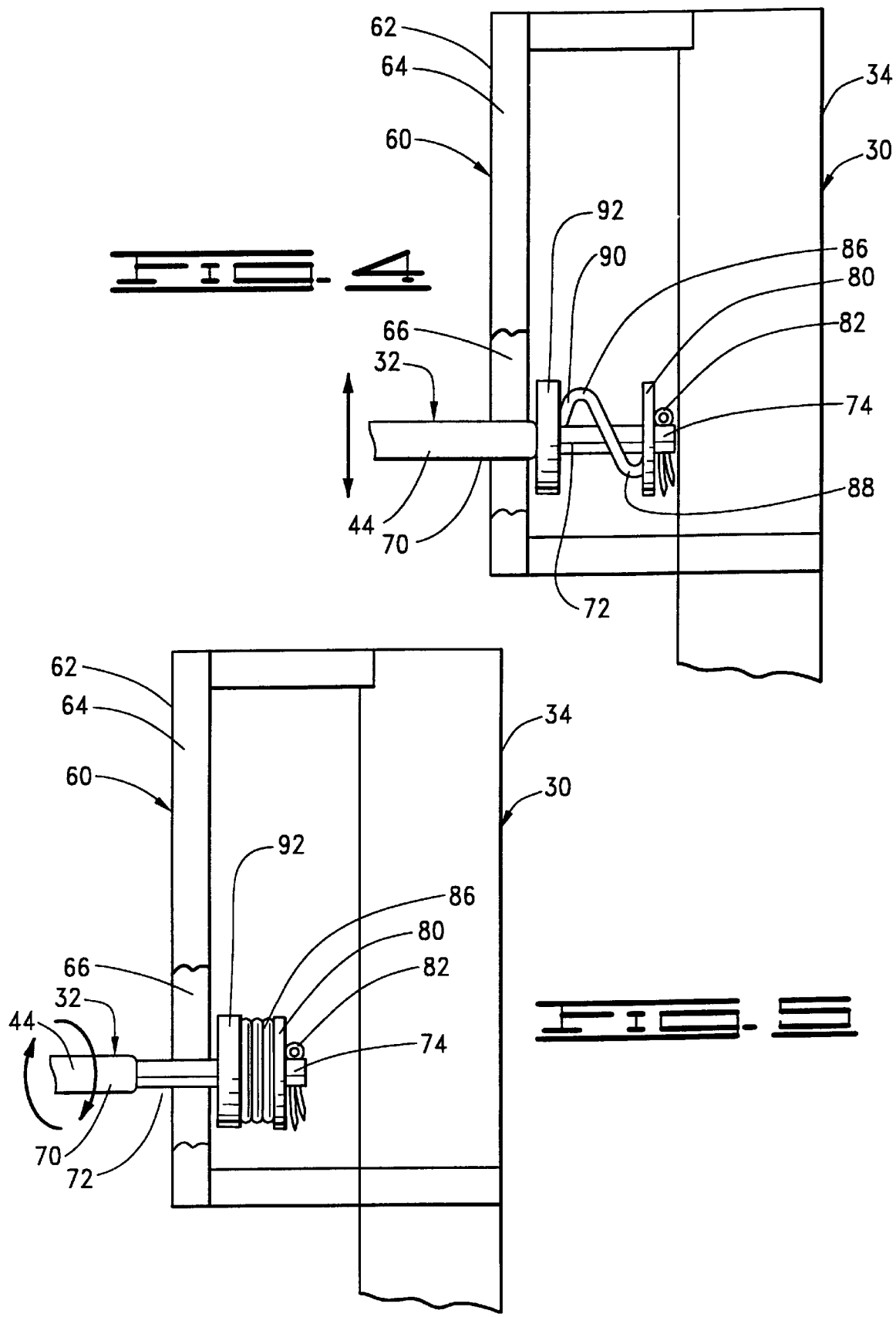

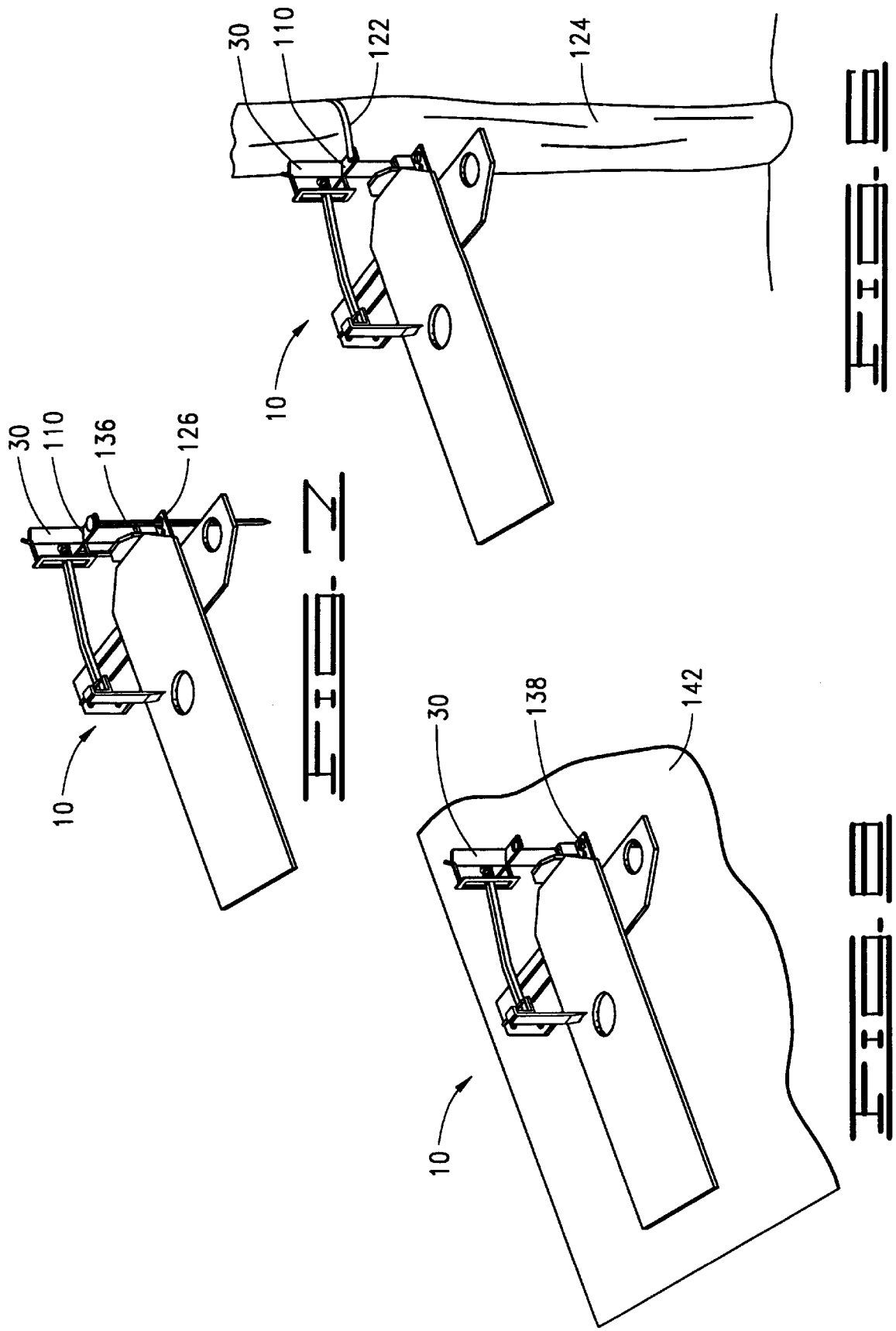

FISH CLEANING DEVICE

FIELD OF THE INVENTION

The present invention relates generally to fish cleaning devices and more particularly to such devices that first kill the fish humanely and then support the fish conveniently for cleaning.

BACKGROUND OF THE INVENTION

Most fishermen prefer to clean their catch shortly after removing the fish from the water. Fish that have been dead for some time prior to cleaning may exhibit an undesirable flavor due to deterioration. Some fish, such as catfish, are difficult to kill because the brain and spinal column are relatively small and difficult to locate. A fish can be killed effectively by decapitation, but this makes cleaning the fish difficult. The most efficient way to clean a catfish is to hold the fish by its head while it is skinned and gutted. As a result, most fishermen simply clean the fish while it is still alive, and remove the head only when the cleaning process is complete. Thus, there is need for a fish cleaning device that can kill the fish effectively without removal of the head.

Various devices are available for use in cleaning fish. Several have a piercing member that stabilizes the fish against a cleaning plate. However, there is a need for a fish cleaning apparatus that will allow improved maneuverability of the fish during the cleaning process. In addition, there is a need for a fish cleaning device that is adapted to be mounted to a support, so that it stabilized against movement during use.

SUMMARY OF THE INVENTION

The present invention is directed to a fish cleaning device. The device comprises a vertical member and a piercing member. The piercing member is mounted to the vertical member for movement between an load/unload position and an operating position. In the operating position, the piercing member is disposed to pierce the body of the fish behind the head. The piercing member is rotatably connected to the vertical member and is sized to pierce the spinal cord of a fish without severing the head of the fish.

In another aspect, the fish cleaning device of the present invention comprises a tray sized to support at least a portion of the body of the fish. The tray has a head area, and a vertical member is secured to the tray adjacent the head area of the tray. A piercing member is movably mounted in the vertical member for movement between an load/unload position and an operating position. The piercing member is positioned to pierce the body of the fish behind the head and is sized to pierce the spinal cord without severing the head of the fish when the head of the fish is supported on the head area of the tray. A mounting assembly is included to removably secure the device to a support.

In yet another aspect, the present invention is directed to a fish cleaning kit comprising a mallet, a knife, a pair of pliers, and a fish cleaning device. The device includes a tray sized to support at least a portion of the body of the fish. The tray has a head area, and a vertical member is secured to the tray adjacent the head area of the tray. The vertical member has a vertical track, and a vertical piercing member with a first end and a second end. The first end of the piercing member is sized to pierce the body of the fish so as to pierce the spinal cord without severing the head. The device further comprises an elongate, horizontal arm with a body portion and a first and a second end. The first end of the horizontal arm is attached to the second end of the piercing member. The second end of the horizontal arm is rotatably and slidably supported in the vertical track of the vertical member. In this way, the piercing member is movable between a load/unload position, in which a fish can be positioned on the tray, and an operating position in which the piercing member is movable to pierce the body of the fish on the tray. The device also includes an accessory support panel comprising means for supporting the knife, the mallet and the pliers.

BRIEF DESCRIPTION OF THE DRAWINGS

FIG. 4 shows a side elevational, enlarged and fragmented view of the device illustrating the rotatable connection assembly of the device. The assembly is shown in the sliding mode.

FIG. 5 shows a side elevational, enlarged and fragmented view of the device illustrating the rotatable connection assembly of the device. The assembly is shown in the rotating mode.

FIG. 6 shows the device mounted to the trunk of a tree.

FIG. 7 shows the device mounted to the ground with stakes.

FIG. 8 shows the device mounted to a table with screws.

FIGS. 9A–9D illustrate the use of the device to stabilize, lift and rotate the fish during the cleaning process.

DETAILED DESCRIPTION OF THE PREFERRED EMBODIMENT

Figure 1:
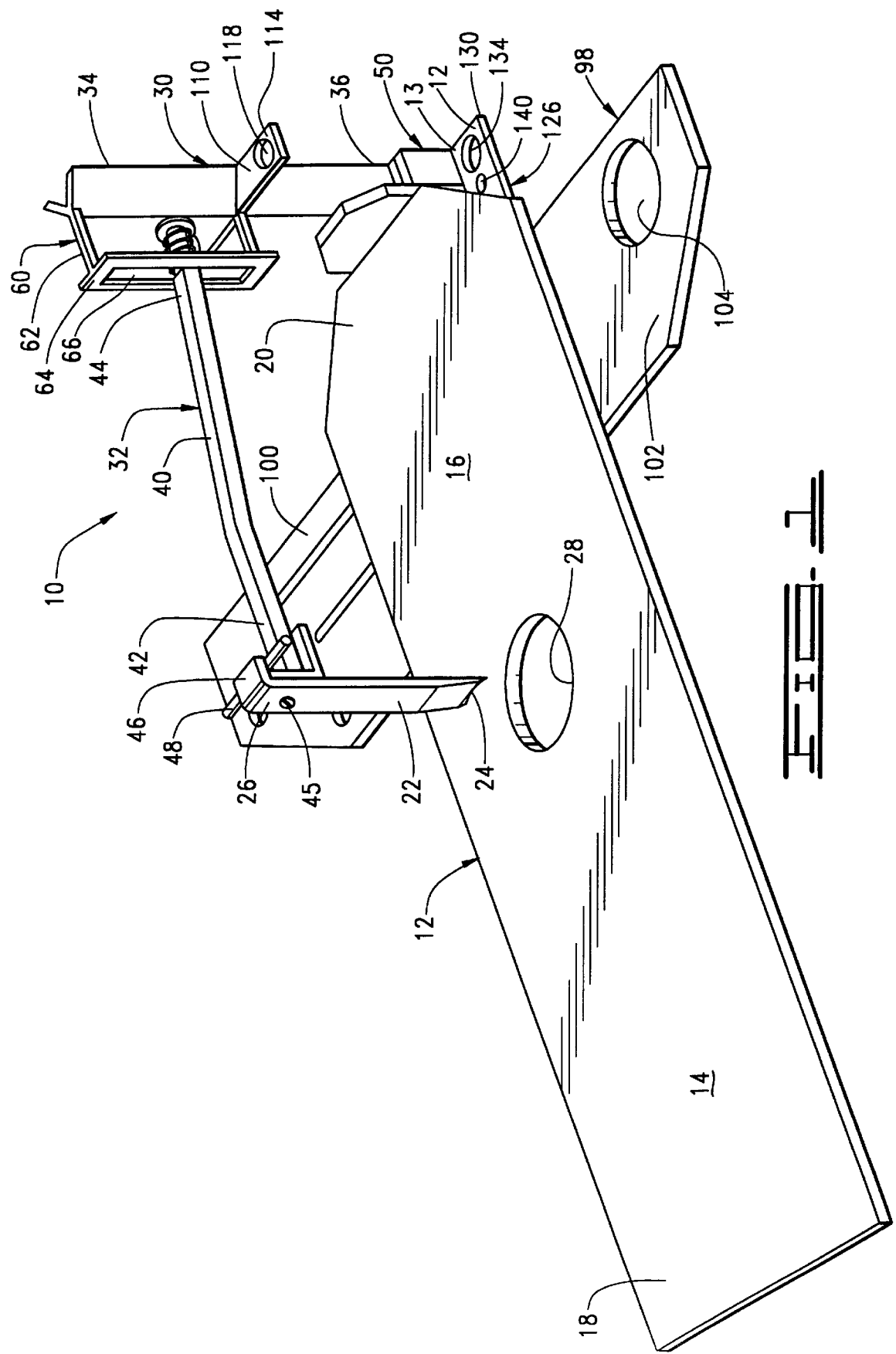
FIG. 1 shows a perspective view of the fish cleaning device of the present invention.

The present invention is directed to a fish cleaning device especially suited for catfish but usable with other fish as well. With reference now to the drawings in general and to FIG. 1 in particular, there is shown therein a fish cleaning device constructed in accordance with a preferred embodiment of the present invention and designated herein generally by the reference numeral 10.

The device 10 preferably comprises an elongate tray 12 sized for supporting at least a portion of the body of a catfish. More preferably, the tray 12 is sized to support catfish of varying sizes. The tray 12 has a body area 14 for supporting the body of the fish and a head area 16 for supporting the head of the fish. The tray 12 further has a first free or tail end 18 and a second or head end 20. The tray 12 may be flat or curved, and may or may not have upwardly turned edges.

Figure 3:
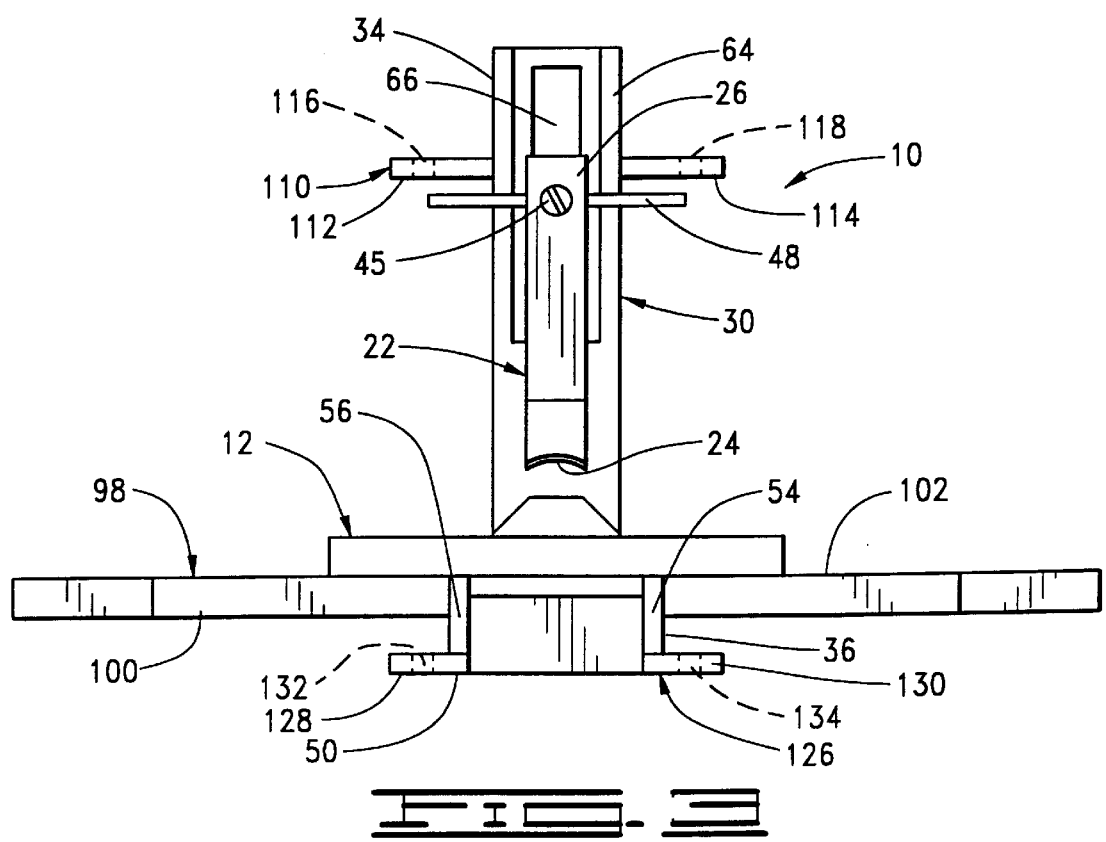
FIG. 3 shows a front end view of the device shown in FIG. 1.
Figures 3A, 3B, 3C, 3D:
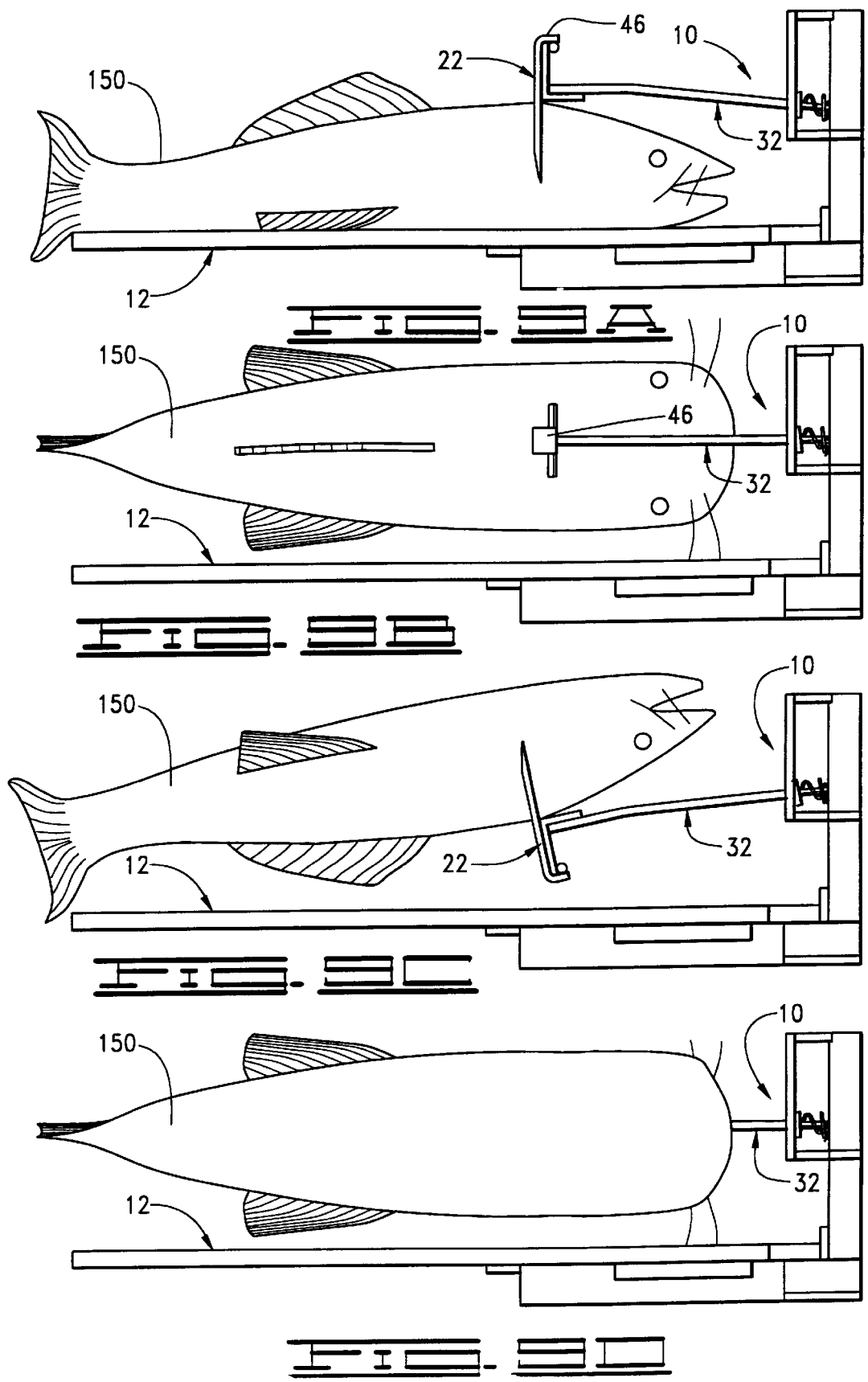

The device 10 further comprises a piercing member such as the blade 22. The blade 22 is sized to pierce the spinal cord of the fish without severing the head of the fish. In a preferred embodiment, the blade 22 is a strip of flat, rigid metal such as steel, having a first end 24 and second end 26. The blade 22 preferably is about ½ to about 1 inch wide, and more preferably about ¾ inch wide, as this is wide enough to sever the spinal cord of most catfish without being wide enough to sever the head. The length of the blade 22 will, of course, depend on how the blade is mounted, but in the preferred configuration illustrated herein the blade is about 3½ inches long. The first end 24 of the blade 22 is sharpened or otherwise adapted to pierce the body of the fish and intersect the spinal cord behind the head. Preferably, the end 24 is curved, as best seen in FIG. 3, for a reason that will become apparent. The second end 26 is mounted in a manner to be described. When mounted, as hereinafter described, the blade 22 is long enough to extend a substantial distance into the body of the fish.

A hole 28 preferably is formed in the tray 12 to receive the sharp end 24 of the blade 22 so that it does not rest on the surface of the tray. This prevents dulling of the blade and secures the sharp edge during storage and transport.

The blade 22 is mounted to the device 10 for movement between a load (and unload) position and an operating position. In the load/unload position, the blade 22 is positioned so that a fish may be placed on and removed from the tray 12. In the operating position, the blade 22 is positioned vertically over the tray 12 disposed to pierce the body of the fish behind the head (See FIG. 9A).

For supporting the blade 22, the device 10 is provided with a vertical member 30 that supports a horizontal arm 32. The vertical member 30 has a first or upper end 34 and second or lower end 36. The lower end 36 is secured to the head end 20 of the tray 12. The horizontal arm 32 comprises an elongate body portion 40 with a first forward end 42 and a second rear end 44. The upper or second end 26 of the blade 22 is attached to the first end 42 of the arm 32 by some suitable means, such as the screw 45. For a reason that will become apparent, the upper end 26 of the blade 22 or the first end 42 of the arm 32, or both, comprises a flattened head 46. In addition, a handle 48 may be provided at the second or upper end 26 of the blade 22 for lifting and manipulating the blade.

As will be appreciated, the configuration of the vertical member 30 and the means by which it is affixed to the head end 20 of the tray 12 can vary. In the embodiment shown in FIG. 1, the vertical member 30 is a length of angle iron supported by a frame 50. The preferred frame 50, seen best in FIGS. 2 and 3, comprises a pair of rails 54 and 56 providing support underneath the tray 12. The lower end 36 of the vertical member 30 is welded between the two ends of the rails 54 and 56, or affixed thereto in some other suitable manner.

Figure 2:
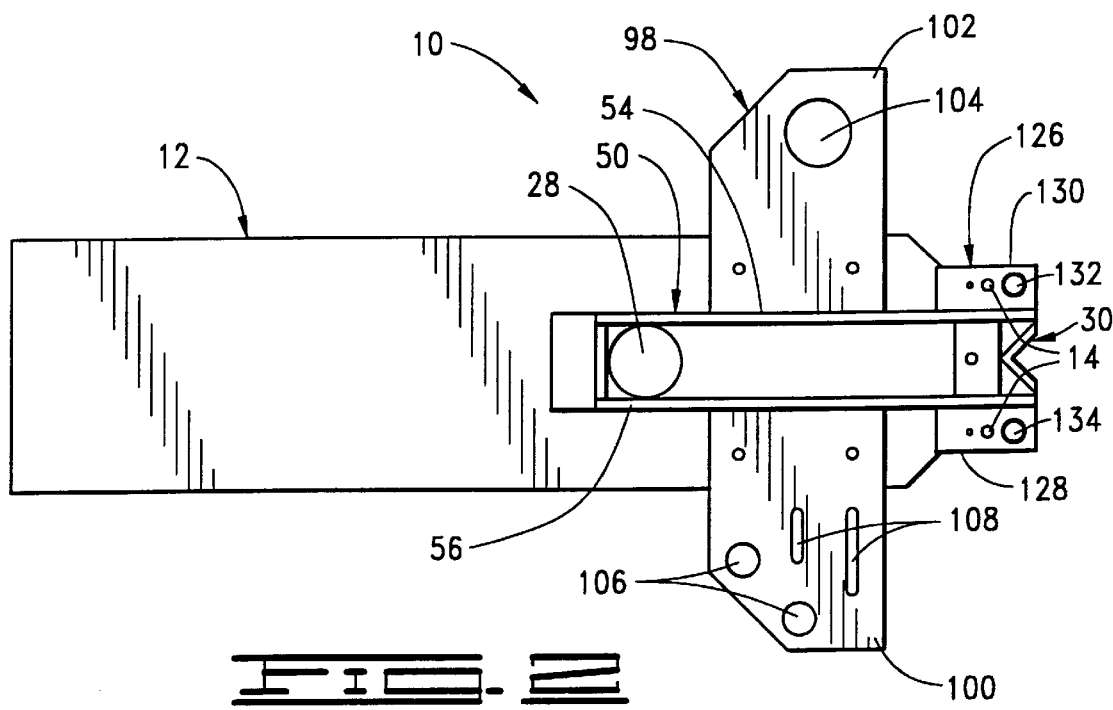
FIG. 2 shows a bottom view of the device in FIG. 1.

As indicated previously, the blade 22 is movably mounted to the vertical member 30. With continuing reference to FIG. 1, and turning now also to FIGS. 4 and 5, the preferred assembly for connecting the rear or second end 44 of the arm 32 to the vertical member 30 will be explained. For moving the blade 22 between the load/unload position and the operating position, the second or rear end 44 of the arm 32 preferably is pivotally attached to the vertical member 30. Alternately, the end 44 of the arm 32 may be vertically slidable on the vertical member 30. Most preferably, the arm 32 is both slidably and pivotally mounted to the vertical member 32, as this greatly increases the maneuverability of the blade 22 and thus the fish supported on it. Mounted in this way, the blade can easily be lifted away from the tray 12 to place the fish belly down on the tray, and then inserted into the neck of the fish to kill it instantly without detaching the head. Cleaning of the fish is facilitated by rotating it on the tray. Thus, the arm 32 preferably is rotatably mounted to the vertical member 30.

All of these manipulations of the fish are readily accommodated by the connecting assembly 60 between the rear end 44 of the arm 32 and the upper end 34 of the vertical member 30. As best seen in FIG. 1, a vertical track 62 is supported a distance in front of the upper end 34 of the vertical member 30. This track 62 comprises a plate 64 defining a vertically oriented slot 66.

Referring still to FIGS. 4 and 5, the rear end 44 of the arm 32 comprises a shaft 70 from which extends an end portion terminating in a free end 74. The shaft 70 shown is square in cross section and sized so that opposing flat sides are slidably receivable in the slot 66 so as to prevent rotation of the shaft when the sides are so engaged. It should be apparent that other geometric configurations, such as hexagons and octagons, will likewise provide parallel opposing sides to engage the slot 66, and that any equilateral polygon with an even number of sides in excess of three will also serve. It will now also be understood that the entire arm 32 may be shaped the same as and be continuous with the shaft 70, but that this is not essential to the operation of the invention.

The end portion preferably comprises a cylindrical extension 72 having a diameter smaller than that of the shaft 70. Thus, the cylindrical extension 72 will freely rotate and slide in the slot 66, while the shaft 70 will only slide and not rotate therein. The rear end 44 of the arm 32 preferably is movable between a sliding position (FIG. 4), in which the shaft 70 is positioned in the slot 66, and a rotating position (FIG. 5) in which the cylindrical extension 72 is positioned in the slot. This is accomplished by moving the arm 32 horizontally.

To prevent the arm 32 from being pulled completely out of the track 62, the free end 74 of the cylindrical extension 72 preferably is provided with a stop, such as the disk 80 secured to the free end by a cotter pin 82 or some other suitable means. Even more desirably, the connecting assembly 60 includes a biasing device for urging the rear end 44 of the horizontal arm 32 into the sliding position, that is, the position in which the shaft 70 is engaged in the slot 66.

With continued reference to FIGS. 4 and 5, the preferred biasing device now will be described. The biasing device preferably is a simple spring mechanism and more preferably a coil spring 86 compressibly supported on the cylindrical extension 72. The spring 86 has a diameter sufficient to receive the cylindrical extension 72, and a length when relaxed about the same as the length of the cylindrical extension.

The spring 86 has a first end 88 and a second end 90. The first end 88 is connected either to the stop 80 or the free end 74 of the cylindrical extension 72. Thus, the first end 88 of the spring 86 is stationery relative to the arm 32. The second end 90 of the spring 86 is attached to a movable disk or washer 92 slidably received on the shaft 70 between the cylindrical extension 72 and the rear end 44 of the arm 32. In this way, when the arm 32 is pulled away from the vertical member 30, the shaft 70 is pulled out of the slot 66 and the spring 86 is compressed between the washer 92 and the disk 80, as seen in FIG. 5. This allows a portion of the cylindrical extension 72 to extend through the slot 66 thereby allowing the arm 32 to be raised and lowered slidably in the track as well as rotated therein a full 360 degrees.

When the arm 32 is released, the spring 86 expands to its resting length and the cylindrical extension 72 is pulled back inside the track 62 behind the slot 66. This, in turn positions the polygonal shaft 70 inside the slot 66 so that the sides of the shaft are slidable, but non-rotatably engaged in the slot.

Returning to FIGS. 1–3, other advantageous features of the invention will be explained. Various tools are used in the process of cleaning fish. Typically these tools include a mallet or hammer, a knife, and a pair of pliers. The device 10 of the present invention includes an accessory support panel 98 for supporting one or more such tools in a handy location. Preferably, the panel 98 takes the form of a cross member with a pair of laterally extending planar portions 100 and 102.

The planar portions 100 and 102 are provided with openings for receiving the tools. For example, a large round hole 104 is provided in the planar portion 102 for receiving the handle of a mallet. Similarly, smaller holes 106 and slots 108 are provided in the planar portion 100 for receiving plier handles and knife blades, respectively. Of course, it will be understood that other means such as hooks, clamps, hook and loop fabric, or magnetic supports, or any combination of these, could be utilized for this purpose instead of the holes and slots shown herein.

With continuing reference to FIG. 1, and turning now also to FIGS. 6–8, yet another desirable feature of the present invention is illustrated. The device 10 is, of course, small and lightweight enough to be carried by the fisherman into and out of a boat, along the shore, outside a cabin, or anywhere else which might be chosen for cleaning the fish. The portability and versatility of this device is highly desirable, as it is best to clean the fish immediately after catching them. Thus, the device 10 preferably is adapted to be secured to several different types of supports, such as the ground, a nearby tree or a worktable or other surface.

To that end, the device 10 may include a first horizontal member 110 secured to the vertical member 30. The first horizontal member 110 preferably is an elongate bar having a pair of opposing ends 112 and 114 (FIGS. 1 and 3) with a hole 116 and 118 in each end. A strap 122 (FIG. 6) is included for connection to the ends 112 and 114 through the holes 116 and 118. The strap 122, then, can be secured adjustably connected around a tree 124 (FIG. 6) or pole or any other vertical support.

In some instance it is desirable to stake the device to the ground, for use at the water's edge, for example. The device 10 preferably is provided with a second horizontal member 126 also attached to the vertical member 30, but lower on the vertical member near the lower end 36 and parallel to the first horizontal member 110. The second horizontal member 126 preferably has a pair of opposing ends 128 and 130 with holes 132 and 134, respectively. The device 10 may include a stakes 136, each of which is receivable in the holes 116, 118, 132 and 134. In this way, the device can be secured to the earth by driving the stakes through the aligned holes and into the earth, as shown in FIG. 7.

Still further, it may be preferable to secure the device 10 to a flat surface such as a worktable. For this purpose, the device 10 may be provided with a pair of self tapping screws 138. The second horizontal member 126, which is near the lower end 36 of the vertical member 30, may be provided with holes 140 sized to receive the screws 138. Thus, the device 10 can be secured to a table or other surface 142, as shown in FIG. 8, by inserting the screws 138 through the holes 140 and then into the table 142. Of course, nuts and bolts could be substituted for the self-tapping screws, if holes are pre-drilled in the table 142. Alternately, a clamp or bracket assembly of some sort could also be employed to secure the second horizontal member 126 to the worktable 142.

Having described the structure of the device 10 in its preferred embodiment, its use and operation now will be explained with reference to FIGS. 9A–9D. First, the fisherman must provide the fish. Next, the support for the device, and the means for securing the device to the support is selected. Then, the device is secured to the support in the manner described herein.

Having secured the device 10, the fish 150 first is placed belly down on the tray 12 with its head on the head area 16 of the tray and with the blade 22 positioned to pierce the body of the fish centrally behind the head, as illustrated in FIG. 9A. The blade 22 is pushed through the body of the fish 150 by pounding a mallet on the flattened head 46 on the upper end of the blade. The blade 22 immediately severs the spinal cord and kills the fish instantly.

Now a further advantage of the vertical track 62 will be apparent. As the mallet hits the head 46 of the blade 22 and pushes the blade down into the body of the fish 150, the rear end 44 of the arm 32 slides downwardly in the slot 66. Yet, because of the flattened sides of the shaft 70, the arm 32 cannot turn from side to side. Thus, the track 62 also serves as a guide to maintain the blade 22 in a vertical position as it impacts the smooth, curved back of the fish 150. This prevents the blade 22 from glancing off the fish 150 and from deviating to the either side of the spinal cord. In addition, the curved end 24 of the blade 22 facilitates a direct downward path.

Next, using a knife, a circumferential incision is made behind the head. This may be carried out by making a partial cut then rotating the fish a quarter turn, making a second partial cut, and rotating the fish another quarter turn. This is repeated, as shown in FIGS. 9B, 9C and 9D, until the fish 150 has been rotated a full 360 degrees and a complete circular cut has been made. Next, the fish 150 is skinned and gutted in a known manner. When the cleaning process is complete, the head is removed and discarded with the innards.

Now it will be apparent that throughout the cleaning process, the fish 150 is stabilized by the blade 22 and supported on the tray 12, yet still can be freely rotated. Thus, a major advantage of the present invention is employed. To rotate the fish 150, the user merely pulls gently on the body of the fish to compress the spring 86 to place the arm 32 in the rotatable mode. Release of the tension on the fish 150 pulls the arm 32 back into the non-rotating mode, while still allowing vertical movement and lifting of the fish.

Figure 10:
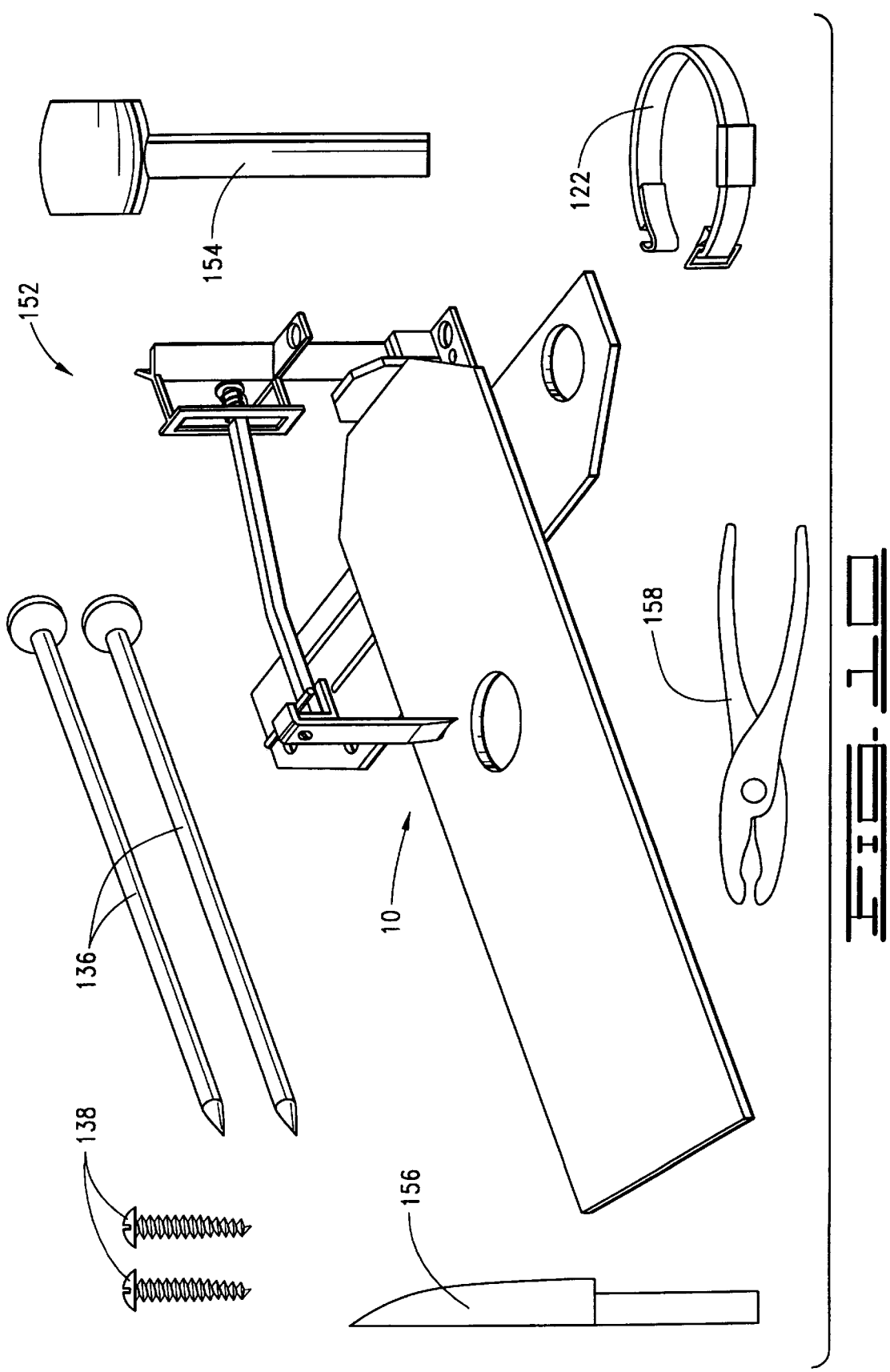
FIG. 10 illustrates in exploded form a fish cleaning kit in accordance with the present invention.

As explained, the process of cleaning the fish 150 involves the use of certain tools, including a mallet, a knife and a pair of pliers. Accordingly, the present invention contemplates a fish cleaning kit 152, which is illustrated in FIG. 10. The kit 152 comprises the device 10, as described hereinabove, and a plurality of tools, such as a mallet 154, a knife 156 and a pair of pliers 158. As previously described, the device 10 can be mounted to a tree, to the ground or to a worktable. Thus, the preferred kit 152 will also include an adjustable strap 122, a pair of stakes 136, or a pair of screws 138. Even more preferably, the kit 152 will include all these items to maximize the mounting options.

Now it will be appreciated that the present invention provides important improvements in devices for cleaning fish and for cleaning catfish in particular. The device kills the fish instantly before the cleaning process begins, and without severing the head. In this way, cleaning the fish is as easy as possible without compromising humane treatment of the fish. Also important is the versatile mounting assembly, which allows the same device to be mounted in at least three different ways.

Changes can be made in the combination and arrangement of the various parts and elements described herein without departing from the spirit and scope of the invention as defined in the following claims.

What is claimed is:

1. A fish cleaning device for cleaning a fish on a work surface, the device comprising:

a support member supportable so as to be outwardly from the surface; and a piercing member mounted to the support member for movement between an load position and an operating position, wherein the piercing member is sized to pierce the spinal cord of a fish without severing the head of the fish, wherein in the operating position the piercing member is disposed to pierce the body of the fish behind the head wherein the piercing member is rotatable connected to the support member so that when the piercing member is inserted in a fish, the fish can be rotated along its longitudinal axis.

2. The device of claim 1 wherein the piercing member is pivotally mounted for movement between the load position and the operating position.

3. The device of claim 1 wherein the piercing member is slidably mounted for movement between the load position and the operating position.

4. The device of claim 1 wherein the piercing member is slidably mounted and pivotally mounted for movement between the load position and the operating position.

5. The device of claim 1 wherein the device further comprises a horizontal arm with an elongate body portion and with a first and a second end, wherein the piercing member has a first end and a second end, wherein the first end of the piercing member is adapted to pierce the body of the fish and wherein the second end of the piercing member is attached to the first end of the horizontal arm, wherein the second end of the horizontal arm is engaged in the support member for movement between a sliding position and rotating position.

6. The device of claim 5 wherein the device further comprises biasing means for urging the second end of the horizontal arm into the sliding position.

7. The device of claim 6 wherein the track in the support member defines a slot, wherein the second end of the horizontal arm comprises a shaft and an end portion, wherein the shaft defines in cross section an equilateral polygon with an even number of sides in excess of three, and wherein the end portion is sized to slidably and rotatably move in the track, wherein the shaft is sized to cause opposing sides to engage the slot thereby permitting the shaft to slide therein but preventing the shaft from rotating therein.

8. The device of claim 7 wherein the end portion of the horizontal arm is a cylindrical extension extending from the shaft and terminating in a free end, and wherein the biasing means comprises a spring assembly comprising:

a coil spring having about the same length as the cylindrical extension when relaxed, the coil spring being coiled around the cylindrical extension and compressibly supported thereon;

whereby when the coil spring is relaxed the polygonal shaft is engaged with the slot permitting only sliding, non-rotatable movement, and so that when the horizontal arm is pulled away from the support member the spring is compressed and the cylindrical extension is engaged with the track permitting sliding and rotatable movement.

9. The fish cleaning device of claim 1 wherein the device comprises an elongate tray have a first free end and a second end secured to the bottom of the support member.

10. The fish cleaning device of claim 9 wherein the tray is provided with a hole sized and positioned to receive the first end of the piercing member.

11. The fish cleaning device of claim 1 further comprising an accessory support panel, the accessory support panel comprising means for supporting at least one cleaning tool.

12. The fish cleaning device of claim 11 wherein the accessory support panel comprises means for supporting a plurality of tools.

13. The fish cleaning device of claim 12 wherein the means for supporting a plurality of tools includes holes sized to receive a selected plurality of tools.

14. The fish cleaning device of claim 13 wherein the selected plurality of tools includes a knife, a mallet and fish cleaning pliers.

15. The fish cleaning device of claim 11 when the accessory support panel comprises a cross member secured to the tray and having a pair of laterally extending planar portions.

16. The fish cleaning device of claim 1 wherein the device comprises at least a first horizontal member secured to the support member and wherein the device further comprises means cooperative with the first horizontal member for securing the device to a support.

17. The fish cleaning device of claim 16 wherein the first horizontal member has a pair of opposing ends, and wherein the device securing means comprises a strap having two ends attachable to the two ends of the first horizontal member, and wherein the device securing means further includes means for adjustably connecting the connecting the strap around a vertical support.

18. The fish cleaning device of claim 16 wherein the device securing means comprises a pair of stakes, wherein the support member has an upper end and a lower end, wherein the device further comprises a second horizontal member positioned near the lower end of the support member, the second horizontal member having opposing ends and provided with a hole in each end, wherein the holes in the ends of the second horizontal member are aligned with the holes in the ends of the first horizontal member, the holes in the first and second horizontal members all being sized to receive the stakes, whereby the device is securable to the earth as a support by inserting the stakes through the holes in the first and second horizontal members and into the earth.

19. The fish cleaning device of claim 16 wherein the support member has a lower end, wherein the first horizontal member is positioned near the lower end of the support member and has a bolt hole in each of the opposing ends, and wherein the device securing means comprises a pair of bolts receivable through the bolt holes in the ends of the second horizontal member, whereby the device is securable to a planar work surface.

20. A fish cleaning device comprising:

an elongate tray having a body portion and a head area, wherein the body portion is sized to support at least a portion of the body of the fish;

a support member secured to the tray adjacent the head area of the tray;

a piercing member movably mounted in the support member for movement between a load position and an operating position, the piercing member having a first end positioned to pierce the body of the fish behind the head and sized to pierce the spinal cord without severing the head of the fish when the head of the fish is supported on the head area of the tray;

wherein the device further comprises a generally horizontal arm with an elongate body portion and with a first and a second end, wherein the piercing member has a first end and a second end, wherein the first end of the piercing member is adapted to pierce the body of the fish and wherein the second end of the piercing member is attached to the first end of the horizontal arm, wherein the second end of the horizontal arm is movably connected to the support member;

wherein the body portion of the tray is provided with a hole sized and positioned to receive the first end of the piercing member; and a mounting assembly adapted to removably secure the device to a support.

21. The fish cleaning device of claim 20 further comprising an accessory support panel, the accessory support panel comprising means for supporting at least one cleaning tool.

22. The fish cleaning device of claim 21 wherein the accessory support panel comprises means for supporting a plurality of tools.

23. The fish cleaning device of claim 22 wherein the means for supporting a plurality of tools includes holes sized to receive a selected plurality of tools.

24. The fish cleaning device of claim 23 wherein the selected plurality of tools includes a knife, a mallet and fish cleaning pliers.

25. The fish cleaning device of claim 22 when the accessory support panel comprises a cross member secured to the tray and having a pair of laterally extending planer portions.

26. The fish cleaning device of claim 20 wherein the mounting assembly comprises at least a first horizontal member secured to the support member and means cooperative with the first horizontal member for securing the device to a support.

27. The fish cleaning device of claim 26 wherein the first horizontal member has a pair of opposing ends, and wherein the securing means comprises a strap having two ends attachable to the two ends of the first horizontal member, and wherein the securing means further includes means for adjustably connecting the connecting the strap around a vertical support.

28. The fish cleaning device of claim 26 wherein the securing means comprises a pair of stakes, wherein the support member has an upper portion and a lower end, wherein the first horizontal member has a hole in each end, wherein the device further comprises a second horizontal member positioned near the lower end of the support member, the second horizontal member having opposing ends and a hole in each end, the holes in the ends of the second horizontal member being aligned with the holes in the ends of the first horizontal member, wherein the holes in the first and second horizontal members all are sized to receive the stakes, whereby the device is securable to the earth as a support by inserting the stakes through the holes in the first and second horizontal members and into the earth.

29. The fish cleaning device of claim 26 wherein the securing means comprises a pair of bolts, wherein the support member has a lower end, wherein the first horizontal member is positioned near the lower end of the support member, and wherein the first horizontal member has a bolt hole in each end, each bolt hole sized to receive a bolt, whereby the device is securable to a planar work surface.

30. The fish cleaning device of claim 20 wherein the support member comprises a vertical track, wherein the second end of the horizontal arm is engaged with the track for vertical movement between the load position and the operating position and for horizontal movement between a sliding position and a rotating position.

31. A fish cleaning kit comprising;
    a mallet;
    a knife;
    a pair of pliers;
    a fish cleaning device comprising:
        a tray sized to support at least a portion of the body of the fish and having a head area;
        a vertical member secured to the tray adjacent the head area of the tray, the vertical member having a vertical track;
        a vertical piercing member with a first end and a second end, the first end being sized to pierce the body of the fish so as to pierce the spinal cord without severing the head;
        an elongate, horizontal arm with a body portion and a first and a second end, wherein the first end of the horizontal arm is attached to the second end of the piercing member, wherein the second end of the horizontal arm is rotatably and slidably supported in the vertical track of the vertical member, whereby the piercing member is movable between a load position in which a fish can be positioned on the tray and an operating position in which the piercing member is movable to pierce the body of the fish on the tray; and
        an accessory support panel comprising means for supporting the knife, the mallet and the pliers.

32. The fish cleaning kit of claim 31 wherein the tray of the fish cleaning device is provided with a hole for receiving the first end of the piercing member.

33. The fish cleaning kit of claim 31 wherein the track of the vertical member defines a slot, wherein the second end of the horizontal arm of the fish cleaning device comprises a square shaft terminating in a cylindrical extension, wherein the square shaft is sized to non-rotatably slide vertically in the slot, and wherein the cylindrical extension is sized to rotatably slide vertically in the slot, wherein the horizontal arm is movable horizontally between a non-rotating position in which the shaft is non-rotatably slidable in the slot and a rotating position in which the cylindrical extension is rotatably slidable in the slot, and wherein the device further comprises a stop for preventing the second end of the horizontal arm from being pulled out of the slot.

34. The fish cleaning kit of claim 33 wherein the fish cleaning device further comprises biasing means for urging the horizontal arm into the non-rotating position.

35. The fish cleaning kit of claim 34 wherein the biasing means comprises a coil spring on the cylindrical extension, wherein the coil spring when relaxed is about the same length as the cylindrical extension, wherein the width of the coil spring is greater than the width of the slot, and wherein the coil spring has a first end attached to the end of the cylindrical extension and a second end attached to the cylindrical extension adjacent the square shaft.

36. The fish cleaning kit of claim 31 wherein the accessory support panel comprises a cross member secured to the tray and having a pair of laterally extending planer portions.

37. The fish cleaning kit of claim 31 further comprising a mounting assembly adapted to mount the device to a support.

38. The fish cleaning device of claim 37 wherein the mounting assembly comprises at least a first horizontal member secured to the vertical member and means cooperative with the first horizontal member for securing the device to a support.

39. The fish cleaning kit of claim 38 wherein the first horizontal member has a pair of opposing ends, and wherein the securing means comprises a strap having two ends attachable to the two ends of the first horizontal member, and wherein the securing means further includes means for adjustably connecting the connecting the strap around a vertical support.

40. The fish cleaning kit of claim 38 wherein the securing means comprises a pair of stakes, wherein the vertical member has an upper portion and a lower end, wherein the first horizontal member has a hole in each end, wherein the device further comprises a second horizontal member positioned near the lower end of the vertical member, the second horizontal member having opposing ends and being provided with a hole in each end, the holes in the ends of the second horizontal member being aligned with the holes in the ends of the first horizontal member, wherein the holes in the first and second horizontal members all are sized to receive the stakes, whereby the device is securable to the earth as a support by inserting the stakes through the holes in the first and second horizontal members and into the earth.

41. The fish cleaning kit of claim 38 wherein the securing means comprises a pair of bolts, wherein the vertical member has a lower end, wherein the first horizontal member is positioned near the lower end of the vertical member, wherein each end of the first horizontal member is provided with a bolt hole sized to receive one of the bolts, whereby the device is securable to a planar work surface.

42. A fish cleaning device comprising:

a vertical track;

a vertically oriented piercing member having a lower piercing end and an upper connecting end; and a horizontal arm with a first end and a second end, the first end attached to the upper piercing end of the piercing member and the second end moveably engaged in the vertical track of the frame for sliding and pivotal movement of the horizontal arm, and for horizontal movement of the arm between a non-rotatable sliding position and a rotating position.

* * * * *

UNITED STATES PATENT AND TRADEMARK OFFICE
CERTIFICATE OF CORRECTION

PATENT NO : 6,139,417
DATED : October 31, 2000
INVENTOR(S) : William O. Finney

It is certified that error appears in the above-identified patent and that said Letters Patent is hereby corrected as shown below:

Column 7, line 2, delete the first occurrence of "an" and substitute

Column 7, line 59, delete "have" and substitute therefor

Column 8, line 21, after the first word connecting, delete --the

Column 9, line 15, delete "when" and substitute therefor --wherein--.

Column 9, line 29, after the first word connecting, delete --the

Column 10, line 13, delete "and" and substitute therefor --in--.

Column 10, line 61, after the first word connecting, delete --the

Signed and Sealed this

Twenty-second Day of May, 2001

Attest:

NICHOLAS P. GODICI

Attesting Officer

Acting Director of the United States Patent and Trademark Office